Nov. 5, 1957　　　　　L. V. DOOLEY　　　　　2,811,994
SLIDING TILTABLE ARBOR TABLE SAW
Filed Feb. 28, 1955　　　　　　　　　　　　　　2 Sheets-Sheet 1

LESLIE V. DOOLEY
*INVENTOR.*
BY *Loyal H. McCarthy*
ATTORNEY.

Nov. 5, 1957

L. V. DOOLEY 2,811,994

SLIDING TILTABLE ARBOR TABLE SAW

Filed Feb. 28, 1955

LESLIE V. DOOLEY
INVENTOR.

BY *Loyal H. McCarthy*

ATTORNEY.

United States Patent Office 2,811,994
Patented Nov. 5, 1957

2,811,994
SLIDING TILTABLE ARBOR TABLE SAW
Leslie V. Dooley, Portland, Oreg.
Application February 28, 1955, Serial No. 491,086
8 Claims. (Cl. 143—47)

My invention relates to table saws which may be moved from place to place and which may be adapted to the cutting of boards or other like materials.

One of the objects of my invention is to provide a table saw adapted to the cutting of boards or other materials as a rip-saw, a cross-cut saw, or at any desired angle with the vertical cut through the material, or angled off from the vertical to provide any predetermined bevel.

Another object of my invention is to provide a table saw of the character described which may be used with the arbor locked in a predetermined position, pushing the material being sawed through the saw, or, at the election of the operator, pulling the saw through the material to be sawed.

Another object of my invention is to provide a table saw of the tiltable arbor type which may be used as a pull saw without interference of any operating parts above the top of the table.

Further objects and advantages of the invention will be apparent from the description and claims.

In the drawings, in which an embodiment of my invention is shown, Fig. 1 is a plan view of my saw showing the tilt mechanism, the slide bars for carrying the saw arbor, the elevation adjusting chain and the control bar for adjusting the saw to the desired position on these slide bars.

Figure 4:
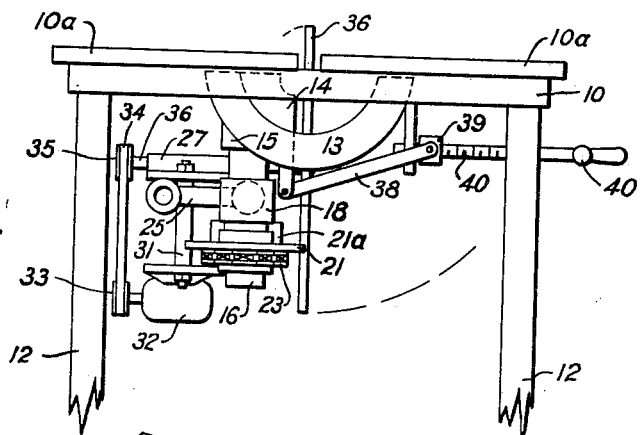
Fig. 4 is an end view of my saw with part of the bench legs broken away, showing the motor mounting and saw arbor, the tilt mechanism, the elevational mechanism and synchronizing chain and one of the arcuate tracks by which the whole unit is suspended and guided for tilting purposes.
Figure 7:
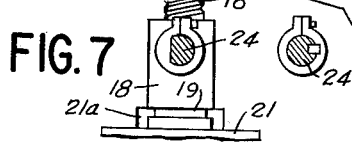
Fig. 7 is a fragmentary detail view showing the relative position of one carriage bar to the vertical adjustment collar and shaft and showing two forms of a carriage bar having a shape other than circular.
Figure 5:
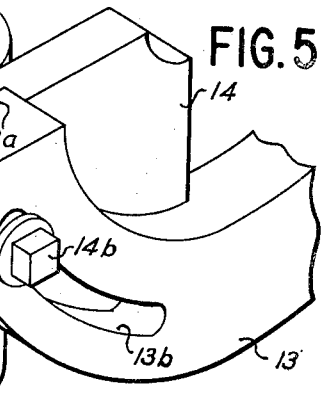
Fig. 5 is a typical three dimensional detail view showing a portion of the arcuate track, the complementary hanger which moves upon said track and the sleeve for receiving the vertical adjustment shaft. This view also shows the guide bolt and slot which stabilize the hanger on the arcuate track.

Referring further to the drawings:

The frame 10 of my saw is provided with thread holes 11 on its upper edge for receiving cap screws, not shown in the drawings, by which the saw table top element 10a, see Fig. 4, is secured to the frame 10. The frame 10 is supported by four legs 12, one at each corner of said frame. An arcuate hanger track 13 is positioned medially of each end of the frame 10. A lip 13a is provided at the inner surface of the arcuate hanger track 13, said hangers 13 and lips 13a positioned thereon being reversed to each other when mounted on the saw frame 10. A slideable hanger 14, provided with a groove 14a which is complementary to the lip 13a of the arcuate hanger track 13, is positioned upon each arcuate hanger track 13 so as to be reversed to each other. The slideable hanger 14 is stabilized upon the arcuate hanger 13 by means of a slot 13b in the arcuate hanger and a cap screw 14b inserted through the slot 13b and secured to slideable hanger 14. The slot 13b is of sufficient length to allow for the necessary tilting or travel of the slideable hanger 14 upon the lip 13a through at least 45° of the arcuate hanger and track 13.

Figure 1:
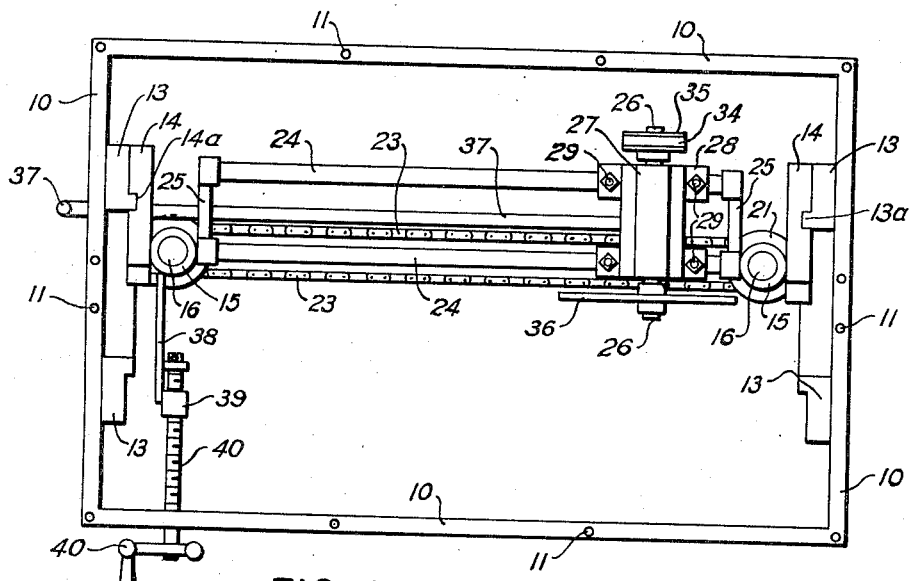
Figure 2:
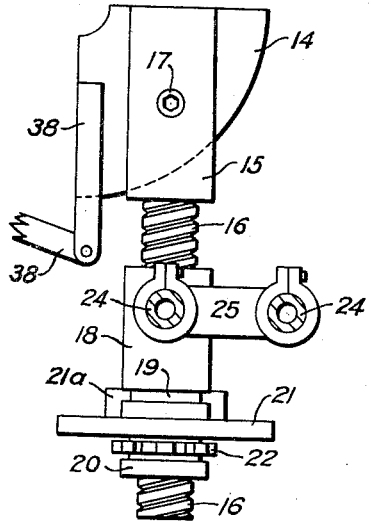
Fig. 2 is a detail view of the tilting and elevational hangers showing the manner in which the elevational adjustment operates, the collar carrying the slide bars and the linkage for tilting the whole unit.

On the inner sides of the slideable hangers 14 are secured by welding, or other known suitable means, sleeves 15, said sleeves 15 being positioned flush with the top surface of the hanger 14 and approximately medially of the width of said hanger. Into the sleeve 15 are secured vertical adjustment shafts 16, said shafts being secured by an Allen type set screw 17, see Fig. 2, or other suitable means.

Figure 6:
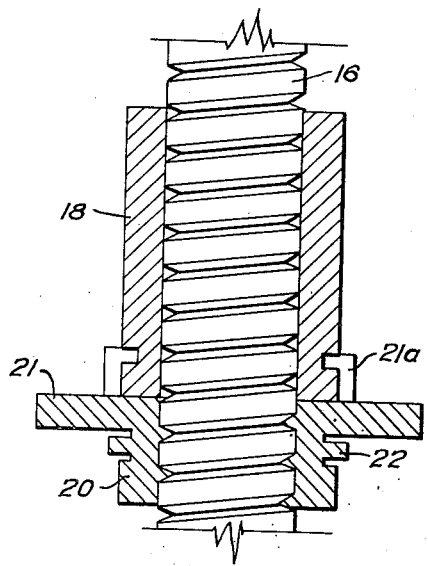
Fig. 6 is a typical center sectional view of the vertical adjustment collar to which the slide bars, not shown in the view, are fastened, the adjustment nut showing the relationship between the adjustment nut, the vertical adjustment collar and the vertical adjustment shaft and the manner in which they are assembled together.
Figure 8:
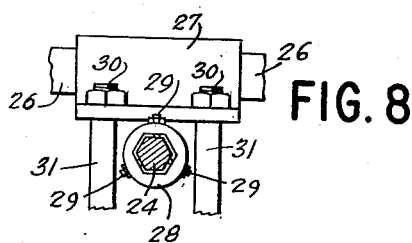
Fig. 8 is a fragmentary detail view showing one polygonal carriage bar and the relationship of the arbor and motor mountings to the carriage bar when a single bar is employed.

The shaft 16 is provided with four threads per inch which allow said shaft to act as a bearing surface as well as providing threads for making vertical adjustments along said shaft. The vertical adjustments are accomplished by means of the collar 18, which is slideable on vertical adjustment shaft 16, being moved upwardly or downwardly on the vertical adjustment shaft 16 by means of the nut 20 which is provided with threads complementary to the threading on the vertical adjustment shaft 16, see Fig. 2 and Fig. 6.

The nut 20 is composed, as integral parts thereof, of a hand wheel 21 for turning said nut 20 on top of which is positioned a lip 21a of slightly less than 180° in circumference. The lip 21a engages and locks in slot 19 in the adjustment collar 18, thereby forcing the adjustment collar upwardly or pulling it downwardly as the nut 20 is turned by means of the hand wheel 21. Immediately below the hand wheel 21 and also integral to the nut 20 is a typical chain sprocket 22. Chain 23 synchronizes by means of sprockets 22 the nuts 20 and the adjustment collars 18 so that when the hand wheel 21 is turned both adjustment collars 18 move simultaneously the same distance upwardly or downwardly on their respective vertical adjustment shafts 16.

Figure 3:
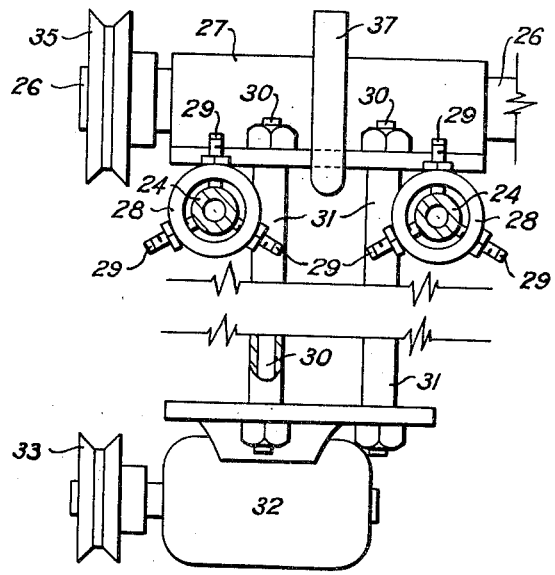
Fig. 3 is a detail view showing the manner of mounting the motor in relation to the saw arbor and showing the arbor carrying sleeves and bearing adjustment studs in said sleeves.

Horizontal slide bars 24 are gripped and held in spaced relationship to each other at each end by brackets 25. The brackets 25 are secured either by welding or by means of being an integral part thereof to the collar 18 at or near the upper edge of said collar in such a manner that one of the bars 24 is positioned medially of said collar 18 and the vertical adjustment shaft 16, while the other bar 24 is retained in a position near the back edge of the slideable hanger 14. The saw arbor 26 is rotatable in and carried by a bearing and housing 27 which is rigidly secured by any suitable means to carrier sleeves 28, each slide bar 24 carrying a carrier sleeve 28. The bearing and housing 27 and the carrier sleeves 28 constitute the carriage. The carrier sleeve 28 and the arbor mechanism and the saw arbor 26 and bearing and housing 27 are aligned on the slide bars 24 by means of adjustable brass bearing stud bolts 29 situated near each end of each carrier sleeve 28. There are three adjustable brass bearing studs spaced approximately 120° from each other around each end of the carrier sleeve 28, see Fig. 3. These adjustable brass bearing stud bolts 29 maintain the saw arbor, bearing and housing in proper relation with the side bar tracks 24. The proper adjustment of these stud bolts allows the carrier sleeves 28 to slide freely upon the slide bars 24 for the normal manual movement of the saw arbor 26 and at the same time provide sufficient frictional contact with the bars 24 to prevent the arbor and carriage from moving slidably upon the track without manual direction of the movement. If the operator desires to firmly secure the arbor and carriage against longitudinal movement, one or more of the brass bearing stud bolts 29 may be adjusted sufficiently tight against one of the slide bars 24 to serve as rigid locking means. Bolts 30 depend from the arbor bearing and housing 27 so as to be between the carrier sleeves 28. The bolts 30 are provided with spacers 31 of the desired length or lengths to secure the motor 32 at the desired necessary distance beneath the bearing and housing 27 and carrier sleeves 28 and allow clearance for the synchronizing chain 23. Saw arbor 26 is rotated by means of the motor 32 turning pulleys 33, belt 34 and pulley 35, which is secured upon said arbor 26. The arbor 26, when rotated, turns a conventional circular saw 36, which is positioned upon the end of said arbor 26 opposite to the pulley 35. An adjustment bar or control 37 is secured to the arbor bearing and housing 27 preferably medially of the carrier sleeves 28 and the bolts 30. By means of this control 37 the arbor and motor unit may be moved continuously backwardly and forwardly along the slide bars 24 or stopped at any desired position. A linkage element 38 pivoted near its center is secured at one end to the forward edge of one of the slideable hangers 14; the other end of the linkage element 38 is pivoted to a collar 39, which collar 39 is movable around threaded adjustment shaft 40 by means of threads within collar 39 complementary to those on the adjustment shaft 40. The linkage element 38, collar 39 and threaded adjustment shaft 40 constitute a threaded collar, shaft and pivoted linkage for tilting the carriage tracks and carriage.

Since the vertical adjustment collars and mechanism consisting of sleeves 15, adjustment shafts 16, slideable collar 18 and adjustment nuts 20 are all dependent from the slideable carrier 14 of my saw and are formed into a rigid unit by means of the slide bars 24 being secured to the slideable collars 18 through the medium of the brackets and spacers 25, the vertical adjustment of my saw can be made at any time, regardless of whether the arbor has been tilted by means of the adjustment shaft 40 and the linkage element 38 or not. Also, at any degree of tilt or any elevational point within the operational limits of the mechanism, the saw may be moved backwardly and forwardly along the slide bars 24 through the medium of the control of adjustment bar 37. Hence, on using my saw has all of the advantages of a tilting arbor design table saw combined with the advantages of a radial arm saw and may, by means of an adjustable guide for holding stock, cut any combination of angles that could be accomplished on a radial arm saw. In addition, my saw as designed and through the inter-action of the combination of its mechanical elements provides all the advantages of a table saw, enabling one to work with a greater degree of safety and much in the same manner as one would while using a conventional table saw.

It is understood that many variations may be made in the mechanical structure of my saw without departing from the spirit of the invention and that the structure as revealed herein is merely a preferred embodiment without any intention of limitation strictly to such structure. For example, instead of two slide bars 24 of circular cross section, one bar could be mounted between and be carried by the collars 18. Such a bar could be provided with either splines to prevent the turning of the arbor and motor mounting mechanism thereon, could be of a generally rectangular or hexagonally cross section so as to prevent turning, or could be substantially round in cross section with one or more sides thereof flattened so as to prevent turning of carrier sleeve 28. Furthermore, there are other mechanical means available for synchronizing the elevational adjustments of the collars 18, such as a rod with two bevel gears spaced thereon engaging complementary bevel gears in lieu of the chain sprockets 22 integral with the nut 20.

There are also other means of adjusting the angular tilt of the saw arbor and the mechanism carrying it with respect to the table top, such as a worm gear on the rod 40 engaging with complementary teeth on the periphery of the slideable hanger 14. An alternative means for obtaining the arcuate travel of the vertical adjustment and bearing rod 16 could be provided without departing from the spirit of my invention. For example, the vertical adjustment and bearing rod 16 could be pivoted to the frame 10 at the upper end of said rod 16, so that its pivotal point would be substantially medial of the depth of the saw table top element 10a. In the structure as revealed in the drawings the arcuate hanger track 13 and the slideable hanger 14 are so designed that the radius center point of the semicircular path followed by the slideable hanger 14 falls at a point substantially medial of the depth of the saw table top element 10a.

Having thus described my invention, what I claim is:

1. In a table type power saw: a frame; a table top secured upon the frame having a longitudinal slot throughout the length of the table top; carriage tracks below and parallel with the longitudinal slot in the table top; hanger connections between the frame and the carriage tracks, said hanger connections having means vertically and/or, selectively, tiltably adjusting the carriage tracks relative to the table top; and an arbor carriage, tilting with the carriage tracks and movable longitudinally on said tracks at any adjusted relation of said carriage tracks to the table top.

2. In a table type power saw: a frame; a horizontal table top upon the frame, provided with a longitudinal slot throughout its length; a tiltable arbor, movable longitudinally of the table top with the arbor either tilted or parallel with the table top; a rotatable cutter carried by said arbor beneath the table top and operating through the longitudinal slot in said table top; a carriage track below and parallel with the longitudinal slot in the table top; a motor; a carriage, movable longitudinally on the carriage track, supporting the arbor, cutter and motor; vertical adjustment shafts, provided with sleeves and threaded nuts connecting with and supporting the longitudinal carriage track, each of said vertical adjustment shafts connecting at its upper end with an arcuate hanger; arcuate hanger tracks connected with said hangers by means of an arcuate slot in each arcuate hanger track, an arcuate lip in each arcuate hanger track, a complementary arcuate groove in each hanger and a cap screw inserted through the slot of each arcuate hanger track, stabilizing the hanger on the hanger tracks in the position of the selective predetermined tilt of the carriage, arbor and rotatable cutter.

3. In a table type power saw: a frame; a table top having a longitudinal slot throughout its length supported by the frame; a carriage; a motor; an arbor and rotatable cutter movable in the longitudinal slot in the table top during cutting operation; arcuate hanger tracks provided with arcuate adjustment slots; said arcuate hanger tracks being positioned one in front and one in back of the rotatable cutter in line with the longitudinal slot in the table top and being so positioned that the radius point of the arc of the arcuate hanger track is medial the upper and lower surface of the table top; arcuate hangers supported by and adjustable by complementary means between the arcuate hangers, and the arcuate hanger tracks implemented through the arcuate slots in the arcuate hanger tracks; vertical adjustment shafts supported by the arcuate hangers; slide bar carriage tracks parallel with the longitudinal slot in the table top; vertical adjustment collars connecting with the slide bar carriage tracks carried on the vertical adjustment shafts, said vertical adjustment shafts being provided with substantially spaced spiral threads at the lower end of said vertical adjustment shafts furnishing suitable bearing surfaces for the vertical adjustment collars; adjustment nuts complementary to and operating upon the threaded portions of the vertical adjustment shafts immediately below the adjustment collars; a manual adjustment wheel and a sprocket wheel integral with each adjustment nut; a sprocket chain operating upon and connecting the nut adjustment sprocket operating at one end of the carriage with the adjustment nut sprocket at the other end of the carriage.

4. In a table type power saw: a horizontal table top, provided with a longitudinal slot; a carriage track; a longitudinally movable arbor carriage, below the table top, adjustable to the selected horizontal and tiltable position by means of adjusting the carriage track; a circular cutter upon the arbor operating through the longitudinal slot in the table top; manual means for moving the carriage, arbor and saw longitudinally of the table top while in a vertical or any selected angle with reference to the table top; and means for locking the carriage against longitudinal movement at the desired elevation and at the desired angle to the table top.

5. In a bench type power saw: a horizontal table top provided with a longitudinal slot substantially full length of the table top; adjustable shaft-type carriage tracks below the table top parallel with the slot in the table top; a frame supporting the table top and supporting through its connections the adjustable shaft-type carriage tracks; arcuate hanger tracks attached to the upper part of the frame, each of said arcuate hanger tracks being provided with an arcuate slot; dependent carriage track hangers adjustably attached to the arcuate hanger tracks by means of cap screws passing through the slots of the arcuate hanger tracks; dependent supporting shafts, adjustable vertically, attached to the adjustable hangers, threaded at their lower ends; slidable sleeves connecting with the carriage tracks; vertical carriage adjusting nuts each integral with a wheel and a sprocket, threaded complementary to and carried by the threaded portion of its respective carriage track supporting hanger, each of said adjusting nuts rotatably connecting with its respective adjustment collar and being rotatable about the threaded portion of its respective shaft supporting the carriage tracks; brackets connecting and holding in spaced relation the adjustable shaft-type carriage tracks; a sprocket chain connecting the sprocket nut on the carriage supporting shaft at one end of the carriage with the sprocket nut at the other end of the carriage; arbor tilting adjusting means consisting of a lever, threaded collar and threaded adjustment shaft, toggle linkage, one end of which connects with the adjustable carriage hanger and the other end with the frame of the table saw; manual means for aligning the carriage on the carriage tracks or, selectively, for locking the carriage against longitudinal movement on the carriage tracks; a carriage moving adjustment bar attached to the movable carriage; and a rotatable cutter operating through the slot of the table top from the arbor located below the table top.

6. In a table type power saw: a frame; a table top consisting of two parts secured to said frame in spaced relationship to each other forming a slot between said parts; an arcuate hanger consisting of a semicircular track and a semicircular lip integral therewith, opposedly positioned a like hanger medially of the opposite end of said frame beneath said table top; slideable hangers, each hanger containing an arcuate groove complementary to the semicircular lip integral with its respective arcuate hanger track, positioned upon each of said arcuate hanger tracks; means for retaining the slideable and arcuate hangers in juxtaposition; vertical adjustment and bearing rods having a few threads per inch therealong; means for securing a vertical adjustment and bearing rod to and depending from each of said hangers; a collar slideable upon each of said vertical adjustment and bearing rods, the collars being opposedly positioned to each other and each having a slide bar bracket for one or more slide bars secured thereto, or integral therewith; a vertical adjusting nut upon each vertical adjustment and bearing rod threaded complementary to said vertical adjustment and bearing rod, said nut consisting of a chain sprocket, hand wheel and means for engaging and controlling said collar slideable upon said vertical adjustment and bearing rod; a sprocket chain engaged upon the sprockets of each of said vertical adjusting nuts, synchronizing said nuts, sprockets and collars; one or more slide bars between said collars secured by the slide bar brackets thereof; a carrier sleeve on each of said slide bars slideable longitudinally upon said bar; a plurality of adjustable stud-type bearings spaced in said carrier sleeve aligning and bearing said carrier sleeve on said slide bar; an arbor housing and bearing secured selectively to said carrier sleeves or carrier sleeve; an arbor rotatable in said arbor housing and bearing; a motor; means for attaching said motor to said arbor housing and bearing, or, selectively, to the carrier sleeves; means for transferring rotary motion from said motor to the rotatable arbor; means for, selectively, positioning or sliding the carrier sleeve, arbor housing and bearing, rotatable arbor and motor longitudinally upon the slide bars; means for tilting the slideable hangers, arbor housing and bearing and rotatable arbor through 45° with respect to the table top while retaining the vertical or longitudinal adjustments of said arbor housing and bearing and rotatable arbor with respect to said table top; and a circular cutter secured upon one end of the rotatable arbor.

7. In a table type power saw: a frame; a table top secured upon the frame having a longitudinal slot throughout the length of the table top; a polygonal or, selectively, splined carriage track below and parallel with the longitudinal slot in the table top; hanger connections between the frame and the carriage track, said hanger connections having means vertically and/or, selectively, tiltably adjusting the carriage track relative to the table top; and an arbor carriage tilting with the carriage track and movable longitudinally on said track at any adjusted relation of said carriage track to the table top.

8. In a table type power saw: a frame; a table top secured upon the frame having a longitudinal slot throughout the length of the table top; a carriage track, substantially circular in cross section, having one or more flattened sides, below and parallel with the longitudinal slot in the table top; hanger connections between the frame and the carriage track, said hanger connections having means vertically and/or, selectively, tiltably adjusting the carriage track relative to the table top; and an arbor carriage tilted with the carriage track and movable longitudinally on said track at any adjusted relation of said carriage track to the table top.

References Cited in the file of this patent
UNITED STATES PATENTS

| 107,346 | Douglas | Sept. 13, 1870 |
|---|---|---|
| 210,100 | Connell | Nov. 19, 1878 |
| 529,839 | Robinson | Nov. 27, 1894 |
| 1,522,604 | Torlinski | Jan. 13, 1925 |
| 1,635,290 | Skoglund | July 12, 1927 |
| 1,703,179 | Skolnik | Feb. 26, 1929 |
| 1,816,069 | Bennett | July 28, 1931 |
| 1,988,102 | Woodward | Jan. 15, 1935 |
| 2,323,247 | Sellmeyer | June 29, 1943 |
| 2,323,248 | Sellmeyer | June 29, 1943 |
| 2,506,076 | Garrison | May 2, 1950 |
| 2,642,902 | Carey | June 23, 1953 |
| 2,703,115 | Beagle | Mar. 1, 1955 |